US012674894B2

(12) United States Patent
Rautalin et al.

(10) Patent No.: US 12,674,894 B2
(45) Date of Patent: Jul. 7, 2026

(54) DYNAMIC AUGMENTATION OF IONOSPHERIC CORRECTION DATA

(71) Applicant: HERE Global B.V., Eindhoven (NL)

(72) Inventors: Sakari Rautalin, Tampere (FI); Saara Kuismanen, Tampere (FI); Pekka-Henrik Niemenlehto, Nokia (FI)

(73) Assignee: HERE GLOBAL B.V., Eindhoven (NL)

( * ) Notice: Subject to any disclaimer, the term of this patent is extended or adjusted under 35 U.S.C. 154(b) by 314 days.

(21) Appl. No.: 18/134,632

(22) Filed: Apr. 14, 2023

(65) Prior Publication Data

US 2024/0345256 A1     Oct. 17, 2024

(51) Int. Cl.
     G01S 19/07          (2010.01)
(52) U.S. Cl.
     CPC ................................. G01S 19/072 (2019.08)
(58) Field of Classification Search
     CPC ...................................................... G01S 19/072
     USPC ..................................................... 342/357.44
     See application file for complete search history.

(56) References Cited

U.S. PATENT DOCUMENTS

| | | | |
|---|---|---|---|
| 9,250,327 B2 | 2/2016 | Kelley et al. | |
| 9,557,419 B2 | 1/2017 | Drescher et al. | |
| 9,923,626 B2 | 3/2018 | Loomis et al. | |
| 2014/0253369 A1* | 9/2014 | Kelley ................. | G01S 19/074 |
| | | | 342/175 |

| | | | |
|---|---|---|---|
| 2014/0292573 A1* | 10/2014 | Drescher ............... | G01S 19/074 |
| | | | 342/357.51 |
| 2016/0377730 A1* | 12/2016 | Drescher ................ | G01S 19/40 |
| | | | 342/357.23 |
| 2018/0217264 A1* | 8/2018 | Syrjärinne .............. | G01S 19/13 |

(Continued)

OTHER PUBLICATIONS

Cabinet Office, "Quasi-Zenith Satellite System Interface Specification Centimeter Level Augmentation Service," IS-QZSS-L6-005, https://qzss.go.jp/en/technical/download/pdf/ps-is-qzss/is-qzss-l6-005.pdf?t=1768514409762 (Year: 2022).*

(Continued)

*Primary Examiner* — Samarina Makhdoom
(74) *Attorney, Agent, or Firm* — Jeffrey R. Moisan; HERE GLOBAL B.V.

(57)          ABSTRACT

A method, apparatus and computer program product are configured to dynamically augment ionospheric correction data. A method receives, from a requesting device, a request for grid layout data, where the grid layout data is associated with one or more geographical areas experiencing atmospheric delay incurred with a satellite-based positioning technique. The method transmits, in response to the request for the grid layout data, a grid layout definition message comprising a grid layout definition associated with the grid layout data associated with the one or more geographical areas. The method generates correction data based in part on the grid layout data, where the correction data is configured to correct the atmospheric delay incurred with the satellite-based positioning technique. The method also generates correction messages comprising at least a portion of the correction data and transmits the correction messages to the requesting device based on a dynamic correction data update rate.

13 Claims, 6 Drawing Sheets

(56) References Cited

U.S. PATENT DOCUMENTS

| | | | |
|---|---|---|---|
| 2019/0004180 A1 | 1/2019 | Jokinen | |
| 2021/0286089 A1* | 9/2021 | Dai | G01S 19/073 |
| 2022/0011446 A1* | 1/2022 | Segal | G01S 19/073 |

OTHER PUBLICATIONS

"3rd Generation Partnership Project; Technical Specification Group Radio Access Network; LTE Positioning Protocol (LPP) (Release 16)", 3GPP TS 37.355 v16.4.0, (Mar. 2021), 298 pages.

Hexagon, "Correction Services—Hexagon Autonomy & Positioning", [online] [Retrieved Mar. 27, 2024] Retrieved via the Wayback Machine: <URL:https://hexagonpositioning.com/autonomous-x/automotive-positioning/serial-production/correction-services>, (dated Sep. 25, 2022), 3 pages.

Karanam et al., "Ionospheric Time Delay Corrections Based on the Extended Single Layer Model Over Low Latitude Region", Geodesy and Geodynamics, vol. 10, Issue 3, (May 2019), pp. 235-240.

Quasi-Zenith Satellite System, "Interface Specification (IS-QZSS), Centimeter Level Augmentation Service (IS-QZSS-L6-001)", [online] [Retrieved Mar. 27, 2024] Retrieved via the Internet: <URL:https://qzss.go.jp/en/technical/download/pdf/ps-is-qzss/is-qzss-16-001.pdf>, (Nov. 5, 2018), 98 pages.

Scottsdale, "Secure Position Augmentation for Real-Time Navigation (SPARTN) Interface Control Document", Version 2.0.1, (Sep. 2021), 53 pages.

Trimble, "High Precision RTX Technology—Trimble GNSS Positioning Services", [online] [Retrieved Mar. 27, 2024] Retrieved via the Wayback Machine: <URL:https://web.archive.org/web/20221208183756/https://positioningservices.trim ble.com/services/rtx/>, (dated Dec. 8, 2022).

* cited by examiner

102

| SERVICE PROVIDER | | NAVIGATION DEVICE |
| 106 | | 104 |

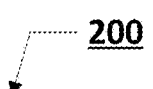
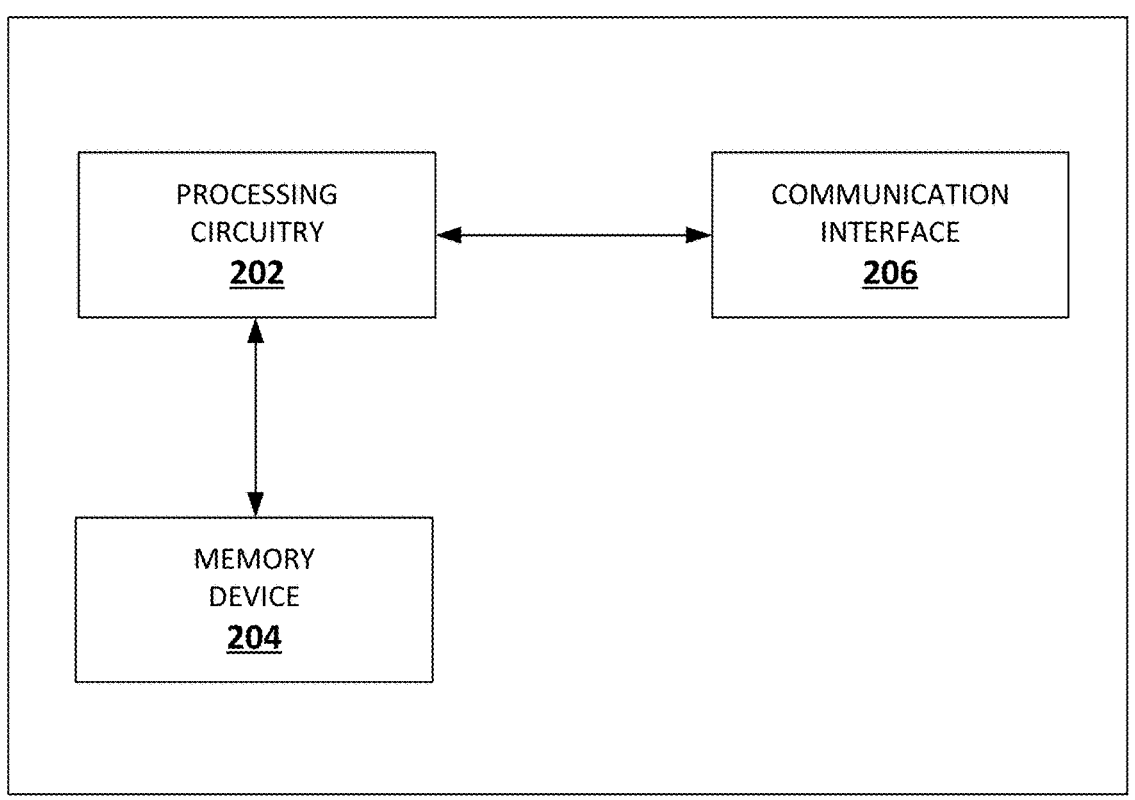
Figure 2

302

```
GNSS-SSR-ArrayOfCorrectionPoints-r16 ::=SEQUENCE {
    referencePointLatitude-r16              INTEGER (-16384..16383),
    referencePointLongitude-r16             INTEGER (-32768..32767),
    numberOfStepsLatitude-r16               INTEGER (0..63),
    numberOfStepsLongitude-r16              INTEGER (0..63),
    stepOfLatitude-r16                      INTEGER (1..511),
    stepOfLongitude-r16                     INTEGER (1..1023),
    bitmaskOfGrids-r16                      BIT STRING (SIZE(64))
    OPTIONAL,  -- Need OP
    ...
}
```

```
GNSS-SSR-ArrayOfGrids-r16 ::=SEQUENCE {
    referencePointLatitude-r16              INTEGER (-16384..16383),
    referencePointLongitude-r16             INTEGER (-32768..32767),
    numberOfGridsLatitude-r16               INTEGER (1..1023),
    numberOfGridsLongitude-r16              INTEGER (1..1023),
    stepOfLatitude-r16                      INTEGER (1.. 16383),
    stepOfLongitude-r16                     INTEGER (1.. 16383),
    ...
}
```

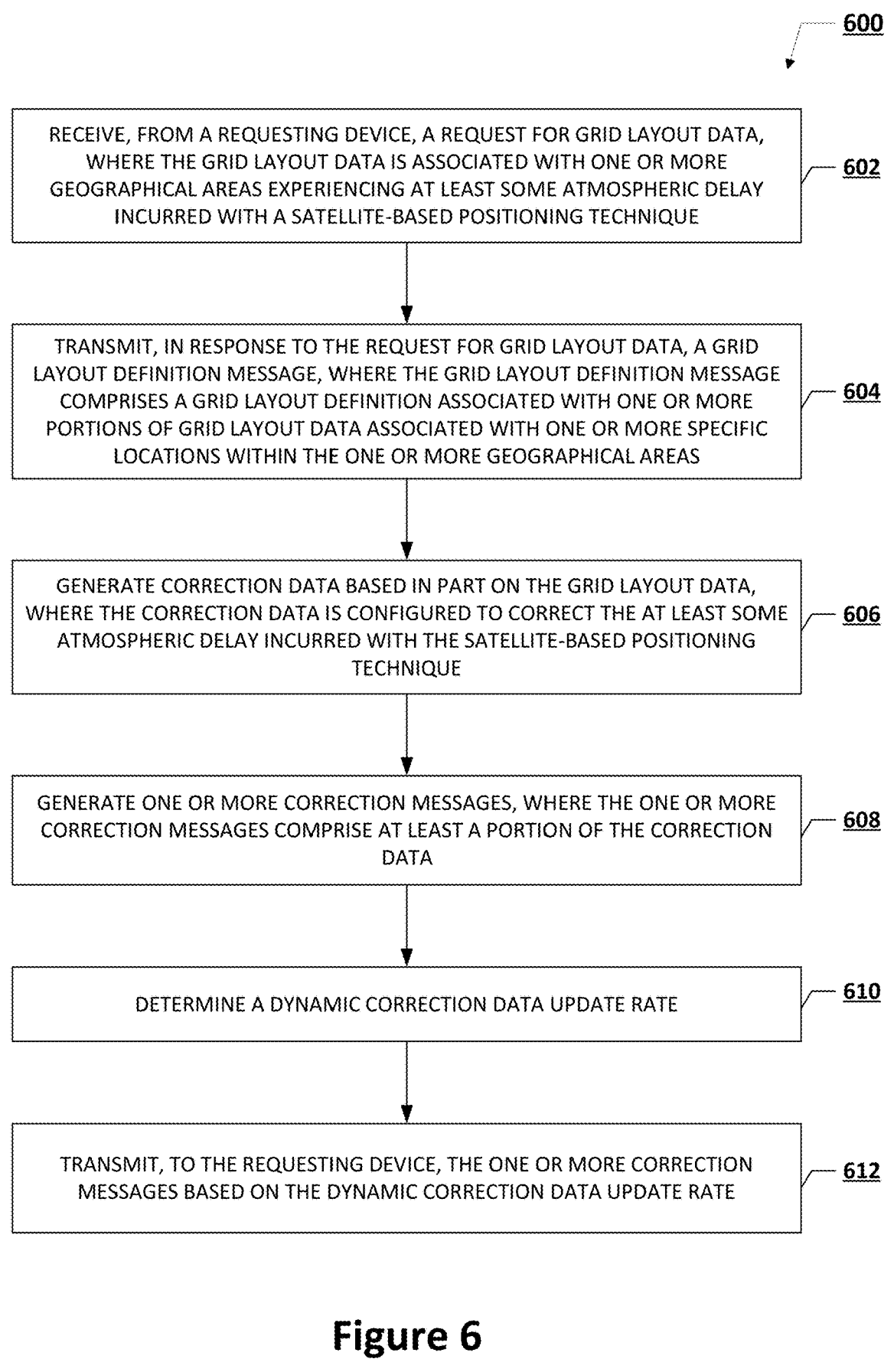

RECEIVE, FROM A REQUESTING DEVICE, A REQUEST FOR GRID LAYOUT DATA, WHERE THE GRID LAYOUT DATA IS ASSOCIATED WITH ONE OR MORE GEOGRAPHICAL AREAS EXPERIENCING AT LEAST SOME ATMOSPHERIC DELAY INCURRED WITH A SATELLITE-BASED POSITIONING TECHNIQUE ⸺ 602

TRANSMIT, IN RESPONSE TO THE REQUEST FOR GRID LAYOUT DATA, A GRID LAYOUT DEFINITION MESSAGE, WHERE THE GRID LAYOUT DEFINITION MESSAGE COMPRISES A GRID LAYOUT DEFINITION ASSOCIATED WITH ONE OR MORE PORTIONS OF GRID LAYOUT DATA ASSOCIATED WITH ONE OR MORE SPECIFIC LOCATIONS WITHIN THE ONE OR MORE GEOGRAPHICAL AREAS ⸺ 604

GENERATE CORRECTION DATA BASED IN PART ON THE GRID LAYOUT DATA, WHERE THE CORRECTION DATA IS CONFIGURED TO CORRECT THE AT LEAST SOME ATMOSPHERIC DELAY INCURRED WITH THE SATELLITE-BASED POSITIONING TECHNIQUE ⸺ 606

GENERATE ONE OR MORE CORRECTION MESSAGES, WHERE THE ONE OR MORE CORRECTION MESSAGES COMPRISE AT LEAST A PORTION OF THE CORRECTION DATA ⸺ 608

DETERMINE A DYNAMIC CORRECTION DATA UPDATE RATE ⸺ 610

TRANSMIT, TO THE REQUESTING DEVICE, THE ONE OR MORE CORRECTION MESSAGES BASED ON THE DYNAMIC CORRECTION DATA UPDATE RATE ⸺ 612

Figure 6

DYNAMIC AUGMENTATION OF IONOSPHERIC CORRECTION DATA

TECHNOLOGICAL FIELD

An example embodiment relates generally to the determination of the position of a navigation device utilizing a satellite-based positioning technique and, more particularly, to the dynamic augmentation of the size and transmission rate of atmospheric delay correction data transmitted to the navigation device.

BACKGROUND

Positioning and navigation solutions commonly depend upon a Global Navigation Satellite System (GNSS) with signals transmitted by GNSS satellites being received by GNSS receivers embedded in or otherwise carried by a variety of different devices. For example, smartphones, smart watches, vehicles, drones and other location-aware devices include GNSS receivers in order to allow the position of the device to be determined. In some instances, the device may include a navigation system and/or a navigation application that is dependent upon the signals received by the GNSS receiver in order to determine the position of the device and to provide navigational assistance.

The GNSS family includes several satellite constellations including the Global Positioning System (GPS) and the Globalnaya Navigatsionnaya Sputnikovaya Sistema (GLO-NASS). Other GNSS satellite constellations include the BeiDou system and the Galileo system. In addition to these global satellite constellations, several regional Satellite-Based Augmentation Systems (SBAS), such as the Quasi-Zenith Satellite System (QZSS), Multifunctional Transport Satellites (MTSAT) Satellite Augmentation System (MSAS), Wide Area Augmentation System (WAAS), European Geostationary Navigation Overlay Service (EGNOS), GPS-Aided Geostationary (GEO) Augmented Navigation (GAGAN), System for Differential Correction and Monitoring (SDCM) and the Indian Regional Navigation Satellite System (IRNSS) having an operational name of NavIC (Navigation with Indian Constellation), have been developed.

In a GNSS system, a navigation satellite orbiting the Earth transmits navigation signals including ranging codes and navigation data interleaved with the ranging codes that a GNSS receiver receives and utilizes to determine the position of the GNSS receiver and, in turn, the device in which the GNSS receiver is embedded. The ranging code allows the GNSS receiver to determine the time required for the signals to travel from the navigation satellite to the GNSS receiver, which correlates to the distance between the navigation satellite and the GNSS receiver. The navigation data includes a set of parameter values of an orbit model defining the orbit of the navigation satellite for a limited period of time. The parameter values provide navigation data known as ephemeris data. The ephemeris data may be utilized by the GNSS receiver to determine the position of the navigation satellite relative to a predefined coordinate system at particular instances of time. Based on the positions of a plurality of navigation satellites, the clock information of the navigation satellites, such as the clock offsets of the navigation satellites relative to GNSS time, and the time required for the signals broadcast by the navigation satellites to be received by the GNSS receiver, the GNSS receiver is configured to determine its position.

The time required for the navigation signals broadcast by the navigation satellites to be received by the GNSS receiver is impacted by several different types of influences that, in turn, can cause an error in the position that is determined for the GNSS receiver. Some receivers, such as low-cost receivers, correct for only a small number of the errors such that the resulting position that is determined has only limited accuracy, such as accuracy within a range of five to ten meters. Other receivers, such as more expensive geodetic receivers, correct for a greater percentage or all of the errors such that the positional accuracy may be to within one centimeter or less.

The various influences that impact the navigation signals transmitted from the navigation satellites to a GNSS receiver can cause errors associated with the satellite clocks, errors associated with the determination of the orbit of the navigation satellite, errors attributable to delays or advances of the navigation signals while propagating through the ionospheric layer, errors associated with delays or advances of the navigation signals while propagating through the tropospheric layer, and/or errors associated with GNSS receiver noise and multipath errors. Although these various sources of error may contribute different amounts to the overall error associated with the position of a GNSS receiver that is determined from the navigation signals, examples of the positional errors attributable to the various sources of error include an error range of +/−2 meters for errors associated with the satellite clocks, an error range for +/−2.5 meters for errors associated with the orbit of the navigation satellite, an error range of +/−5 meters for errors attributable to delays or advances for navigation signals propagating through the ionospheric layer, an error range 0 to 0.5 meters for delays for navigation signals propagating through the tropospheric layer, an error range for +/−0.3 meters for receiver noise and an error range of 0 to 1 meters for multipath errors.

Techniques for improving the performance of GNSS-based positioning have been developed including differential GNSS (D-GNSS), real-time-kinematic technology (RTK), precise point positioning (PPP) and PPP-RTK, as well as techniques that combine other positioning sources to improve performance such as inertial sensor integration, and the analysis of Wi-Fi, Bluetooth or other wireless signals. With respect to PPP, for example, different types of corrections are computed on the basis of data collected by a network of reference stations. The correction data includes corrections for some, but not necessarily all, of satellite orbits and clocks, code biases, phase biases, ionospheric errors and tropospheric errors and/or for a combination of some, but not necessarily all, of the satellite orbits and clocks, code biases, phase biases, ionospheric errors and tropospheric errors. The correction data may then be transmitted by a correction service via a network connection, by satellites in the L-band or otherwise to navigation devices. The navigation devices, in turn, can use the correction data to mitigate the effects of different types of errors.

As noted supra, the errors attributable to advances and/or delays of the navigation signals propagating through the ionospheric layer may be the largest source of error in relation to the determination of the position of the navigation device. The error created by the ionosphere is attributable to the interaction of atmospheric particles with the navigation signals propagating through the ionosphere. The propagation speed of the navigation signals within the ionosphere and, in turn, the time required for the navigation signals to propagate through the ionosphere depends on the electron density of the ionosphere. The ionosphere is a dispersive medium such that the effect of the ionosphere on the navigation signals, such as the delay or advance of the navigation signals that is caused by the ionosphere, depends upon both the properties of the navigation signals, such as the frequency of the navigation signals, that are propagating therethrough as well as the respective locations of the navigation satellites and the GNSS receiver. By way of example of the frequency dependency and with respect to the navigation signals utilized by a GNSS-based positioning technique, the code modulations on the carrier waves experience a delay during their propagation through the ionosphere such that the code modulations appear to take longer to reach the GNSS receiver. However, the carrier waves themselves experience an advance during their propagation through the ionosphere such that the carrier waves appear to take less time to reach the GNSS receiver.

Ionospheric delays and advances can be represented by total electron content (TEC) values. TEC values can be mapped to corresponding delays or advances of the navigation signals based on the frequencies of the navigation signals, which are known to the GNSS receiver. TEC values constitute both a vertical TEC (VTEC) and a slant TEC (STEC). The VTEC represents the ionospheric delays or advances in an instance in which the navigation signal is propagating directly downward toward the Earth, that is, in the direction defined by the Earth's gravitational force. The STEC represents the ionospheric delay or advance in an instance in which the navigation signals are propagating at a non-zero angle relative to the direction defined by the Earth's gravitational force, such that the navigation signals are propagating at an angle through the ionospheric layer and are therefore within the ionospheric layer for a longer period of time so as to experience additional delay or advance.

An ionospheric activity model can be defined in various manners. For example, an ionospheric activity model may be defined as a Klobuchar model, a NeQuick model, an IONosphere Map Exchange (IONEX) Global Ionosphere Maps (GIM) model, or a Quasi-Zenith Satellite System (QZSS) model or the ionospheric activity model may be defined by spherical harmonic coefficients. Some models, such as a Klobuchar model, have mutual parameters that apply globally, such that the ionospheric delay or advance at any given location is calculated from the same set of model parameters. Other models, however, are regional with the ionospheric delay or advance calculated utilizing different regional models. For example, the QZSS ionospheric activity model utilizes a plurality of regional models. Ionospheric corrections may therefore be provided for different regions, which leads to a number of grids.

Ionospheric correction models can be based on the expected or predicted behavior of the ionosphere or based on substantially real-time estimations. For example, the Klobuchar model is empirical and is based on an assumption that the ionosphere behaves in a predefined manner. As a result, the Klobuchar model can be relied upon to remove about 50% of the errors attributable to propagation of the navigation signals through the ionosphere. Other models, such as the IONEX GIM model are calculated using observations from GNSS satellites at reference stations. These models assume that the delays or advances of the navigation signals that are attributable to the ionosphere can be estimated from multi-frequency observations at the reference stations. By continuously estimating the delays or advances of the navigation signals caused by the ionosphere for multiple visible navigation satellites at a plurality of reference stations, a model of the TEC in the atmosphere can be created. The TEC model can, in turn, be utilized to estimate the delays or advances of navigation signals at a given time and location. Multiple different global IONEX GIM models are available, such as a rapid solution that is provided with a maximum of 24 hour latency and a predicted solution from both one and two days prior.

The Long Term Evolution (LTE) positioning protocol (LPP) specification defines an ionospheric activity model similar to the QZSS model. In these ionospheric activity models, a grid is defined which is associated with an area of the Earth's surface at which ionospheric correction data will be valid. In this regard, a grid is a collection of points that cover an area of the Earth's surface. Each point, in turn, may be defined as a two-dimensional coordinate identifying a point on the Earth's surface, such as in terms of latitude and longitude. For each visible satellite within the area, STEC values are defined with the STEC values represented as polynomials and residuals. The STEC value at any grid point can therefore be calculated based upon an evaluation of the polynomial and the residual at the respective grid point. Between the grid points, STEC values may be determined by interpolating between the STEC values at nearby grid points. As each grid is associated with only a certain area, multiple grids may be defined in order to cover larger portions of the Earth or to cover the entire Earth.

For the various ionospheric grid models, such as the LPP model and the QZSS model, that are utilized to determine the delays or advances of the navigation signals propagating through the ionosphere, the grid is generally predefined. The STEC values provided by a grid may remain the same over time or may be updated from time to time. At any point in time, however, the grid utilized by an ionospheric activity model has a static configuration with all of the navigation devices utilizing the same grid. As a result, the grid and, as a result, the ionospheric activity model does not take into account variations in the grid which, in turn, leads to positional inaccuracy.

BRIEF SUMMARY

The details of some embodiments of the subject matter described in this specification are set forth in the accompanying drawings and the description below. Other features, aspects, and advantages of the subject matter will become apparent from the description, the drawings, and the claims.

In an example embodiment, a computer-implemented method comprises receiving, from a requesting device, a request for grid layout data, where the grid layout data is associated with one or more geographical areas experiencing at least some atmospheric delay incurred with a satellite-based positioning technique. The computer-implemented method also comprises transmitting, in response to the request for the grid layout data, a grid layout definition message, where the grid layout definition message comprises a grid layout definition associated with the grid layout data associated with the one or more geographical areas. The computer-implemented method also comprises generating correction data based in part on the grid layout data, where the correction data is configured to correct the at least some atmospheric delay incurred with the satellite-based positioning technique. The computer-implemented method also comprises generating one or more correction messages, where the one or more correction messages comprise at least a portion of the correction data. The computer-implemented method also comprises determining a dynamic correction data update rate. The computer-implemented method also comprises transmitting, to the requesting device, the one or more correction messages based on the dynamic correction data update rate.

The computer-implemented method further comprises where the grid layout data of the grid layout definition message comprises data associated with one or more individual grids, and where the one or more individual grids comprise one or more correction data points associated with one or more specific locations within the one or more geographical areas.

The computer-implemented method further comprises receiving, from the requesting device, a request for correction data, where the request for correction data is based in part on a position estimation of the requesting device.

The computer-implemented method further comprises where generating the correction data comprises applying a polynomial model to the one or more correction data points of the one or more individual grids.

The computer-implemented method, where generating the correction data associated with the one or more correction data points further comprises fitting polynomials of a plurality of polynomial models to the one or more correction data points to determine a preferred polynomial model. The computer-implemented method also comprises where determining the preferred polynomial model is based in part on a comparison of a corresponding data size associated with each polynomial model of the plurality of polynomial models. The computer-implemented method also comprises where the corresponding data size of the preferred polynomial model is smaller relative to the respective corresponding data size of each of the other polynomials of the plurality of polynomial models.

The computer-implemented method further comprises where the dynamic correction data update rate is based in part on an ionospheric activity model.

The computer-implemented method further comprises where the ionospheric activity model describes ionospheric activity data related to the one or more geographical areas experiencing the at least some atmospheric delay incurred with the satellite-based positioning technique. The computer-implemented method also comprises where the ionospheric activity data comprises at least one of one or more portions of current ionospheric activity data, one or more portions of predicted ionospheric activity data, one or more portions of current solar activity data, or one or more portions of predicted solar activity data.

The computer-implemented method further comprises where the dynamic correction data update rate is based in part on a predetermined change threshold associated with one or more data values associated with the ionospheric activity data.

The computer-implemented method further comprises where the polynomials of the plurality of polynomial models are fit to the one or more correction data points in response to a determination that the ionospheric activity model has been updated.

The computer-implemented method further comprises where the polynomials of the plurality of polynomial models are fit to the one or more correction data points in response to a determination that a navigation satellite associated with the satellite-based positioning technique is within view of the one or more individual grids.

The computer-implemented method further comprises where the dynamic correction data update rate is based in part on a time of day relative to the one or more specific locations within the one or more geographical areas.

In another example embodiment, an apparatus comprising processing circuitry and at least one memory including computer program code is provided. The at least one memory and the computer program code are configured to, with the processing circuitry, cause the apparatus at least to receive, from a requesting device, a request for grid layout data, where the grid layout data is associated with one or more geographical areas experiencing at least some atmospheric delay incurred with a satellite-based positioning technique. The computer program code is also configured to, with the processing circuitry, cause the apparatus to transmit, in response to the request for the grid layout data, a grid layout definition message, where the grid layout definition message comprises a grid layout definition associated with the grid layout data associated with the one or more geographical areas. The computer program code is also configured to, with the processing circuitry, cause the apparatus to generate correction data based in part on the grid layout data, where the correction data is configured to correct the at least some atmospheric delay incurred with the satellite-based positioning technique. The computer program code is also configured to, with the processing circuitry, cause the apparatus to generate one or more correction messages, where the one or more correction messages comprise at least a portion of the correction data. The computer program code is also configured to, with the processing circuitry, cause the apparatus to determine a dynamic correction data update rate. The computer program code is also configured to, with the processing circuitry, cause the apparatus to transmit, to the requesting device, the one or more correction messages based on the dynamic correction data update rate.

The computer program code further comprises where the grid layout data of the grid layout definition message comprises data associated with one or more individual grids, and where the one or more individual grids comprise one or more correction data points associated with one or more specific locations within the one or more geographical areas.

The computer program code further causes the apparatus to receive, from the requesting device, a request for correction data, where the request for correction data is based in part on a position estimation of the requesting device.

The computer program code further causes the apparatus to apply a polynomial model to the one or more correction data points of the one or more individual grids.

The computer program code to generate the correction data associated with the one or more correction data points further causes the apparatus to fit polynomials of a plurality of polynomial models to the one or more correction data points to determine a preferred polynomial model, where determining the preferred polynomial model is based in part on a comparison of a corresponding data size associated with each polynomial model of the plurality of polynomial models, and where the corresponding data size of the preferred polynomial model is smaller relative to the respective corresponding data size of each of the other polynomials of the plurality of polynomial models.

The computer program code further comprises where the dynamic correction data update rate is based in part on an ionospheric activity model.

The computer program code further comprises where the ionospheric activity model describes ionospheric activity data related to the one or more geographical areas experiencing the at least some atmospheric delay incurred with the satellite-based positioning technique. The computer program code also comprises where the ionospheric activity data comprises at least one of one or more portions of current ionospheric activity data, one or more portions of predicted ionospheric activity data, one or more portions of current solar activity data, or one or more portions of predicted solar activity data.

The computer program code further comprises where the dynamic correction data update rate is based in part on a predetermined change threshold associated with one or more data values associated with the ionospheric activity data.

In yet another example embodiment, a computer program product comprising at least one non-transitory computer-readable storage medium has computer-executable program code instructions stored therein. The computer-executable program code instructions comprise program code instructions to receive, from a requesting device, a request for grid layout data, where the grid layout data is associated with one or more geographical areas experiencing at least some atmospheric delay incurred with a satellite-based positioning technique. The computer-executable program code instructions are also configured to transmit, in response to the request for the grid layout data, a grid layout definition message, where the grid layout definition message comprises a grid layout definition associated with the grid layout data associated with the one or more geographical areas. The computer-executable program code instructions are also configured to generate correction data based in part on the grid layout data, where the correction data is configured to correct the at least some atmospheric delay incurred with the satellite-based positioning technique. The computer-executable program code instructions are also configured to generate one or more correction messages, where the one or more correction messages comprise at least a portion of the correction data. The computer-executable program code instructions are also configured to determine a dynamic correction data update rate. The computer-executable program code instructions are also configured to transmit, to the requesting device, the one or more correction messages based on the dynamic correction data update rate.

The computer-executable program code instructions further comprise where the grid layout data of the grid layout definition message comprises data associated with one or more individual grids, and where the one or more individual grids comprise one or more correction data points associated with one or more specific locations within the one or more geographical areas.

The computer-executable program code instructions are further configured to receive, from the requesting device, a request for correction data, where the request for correction data is based in part on a position estimation of the requesting device.

The computer-executable program code instructions are further configured to apply a polynomial model to the one or more correction data points of the one or more individual grids.

The computer-executable program code instructions to generate the correction data associated with the one or more correction data points are further configured to fit polynomials of a plurality of polynomial models to the one or more correction data points to determine a preferred polynomial model, where determining the preferred polynomial model is based in part on a comparison of a corresponding data size associated with each polynomial model of the plurality of polynomial models, and where the corresponding data size of the preferred polynomial model is smaller relative to the respective corresponding data size of each of the other polynomials of the plurality of polynomial models.

The computer-executable program code instructions further comprise where the dynamic correction data update rate is based in part on an ionospheric activity model.

The computer-executable program code instructions further comprise where the ionospheric activity model describes ionospheric activity data related to the one or more geographical areas experiencing the at least some atmospheric delay incurred with the satellite-based positioning technique. The computer-executable program code instructions also comprise where the ionospheric activity data comprises at least one of one or more portions of current ionospheric activity data, one or more portions of predicted ionospheric activity data, one or more portions of current solar activity data, or one or more portions of predicted solar activity data.

The computer-executable program code instructions further comprise where the dynamic correction data update rate is based in part on a predetermined change threshold associated with one or more data values associated with the ionospheric activity data.

The details of some embodiments of the subject matter described in this specification are set forth in the accompanying drawings and the description below. Other features, aspects, and advantages of the subject matter will become apparent from the description, the drawings, and the claims.

In yet another example embodiment, an apparatus comprises the means for receiving, from a requesting device, a request for grid layout data, where the grid layout data is associated with one or more geographical areas experiencing at least some atmospheric delay incurred with a satellite-based positioning technique. The apparatus also comprises the means for transmitting, in response to the request for the grid layout data, a grid layout definition message, where the grid layout definition message comprises a grid layout definition associated with the grid layout data associated with the one or more geographical areas. The apparatus also comprises the means for generating correction data based in part on the grid layout data, where the correction data is configured to correct the at least some atmospheric delay incurred with the satellite-based positioning technique. The apparatus also comprises the means for generating one or more correction messages, where the one or more correction messages comprise at least a portion of the correction data. The apparatus also comprises the means for determining a dynamic correction data update rate. The apparatus also comprises the means for transmitting, to the requesting device, the one or more correction messages based on the dynamic correction data update rate.

The apparatus also comprises where the grid layout data of the grid layout definition message comprises data associated with one or more individual grids, and where the one or more individual grids comprise one or more correction data points associated with one or more specific locations within the one or more geographical areas.

The apparatus also comprises the means for receiving, from the requesting device, a request for correction data, where the request for correction data is based in part on a position estimation of the requesting device.

The apparatus also comprises where generating the correction data comprises applying a polynomial model to the one or more correction data points of the one or more individual grids.

The apparatus also comprises where generating the correction data associated with the one or more correction data points further comprises fitting polynomials of a plurality of polynomial models to the one or more correction data points to determine a preferred polynomial model. The apparatus also comprises where determining the preferred polynomial model is based in part on a comparison of a corresponding data size associated with each polynomial model of the plurality of polynomial models. The apparatus also comprises where the corresponding data size of the preferred polynomial model is smaller relative to the respective corresponding data size of each of the other polynomials of the plurality of polynomial models.

The apparatus also comprises where the dynamic correction data update rate is based in part on an ionospheric activity model.

The apparatus also comprises where the ionospheric activity model describes ionospheric activity data related to the one or more geographical areas experiencing the at least some atmospheric delay incurred with the satellite-based positioning technique. The apparatus also comprises where the ionospheric activity data comprises at least one of one or more portions of current ionospheric activity data, one or more portions of predicted ionospheric activity data, one or more portions of current solar activity data, or one or more portions of predicted solar activity data.

The apparatus also comprises where the dynamic correction data update rate is based in part on a predetermined change threshold associated with one or more data values associated with the ionospheric activity data.

The apparatus also comprises where the polynomials of the plurality of polynomial models are fit to the one or more correction data points in response to a determination that the ionospheric activity model has been updated.

The apparatus also comprises where the polynomials of the plurality of polynomial models are fit to the one or more correction data points in response to a determination that a navigation satellite associated with the satellite-based positioning technique is within view of the one or more individual grids.

The apparatus also comprises where the dynamic correction data update rate is based in part on a time of day relative to the one or more specific locations within the one or more geographical areas.

BRIEF DESCRIPTION OF THE DRAWINGS

Figure 1:
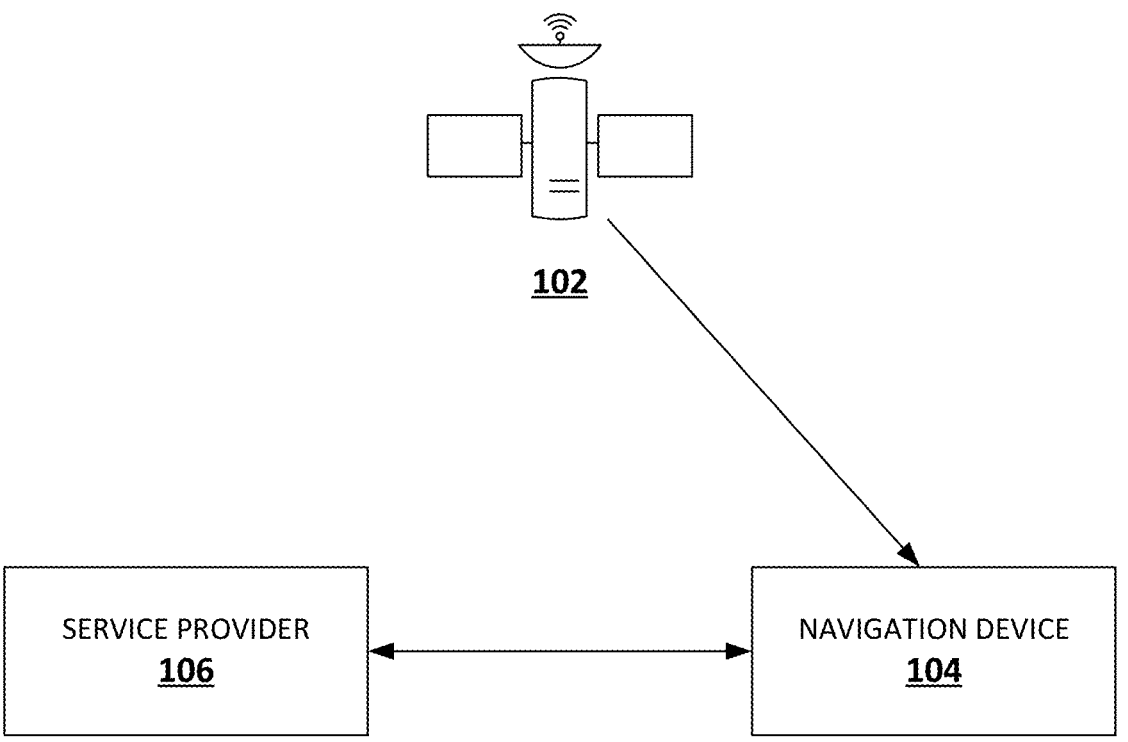
Figure 4A:
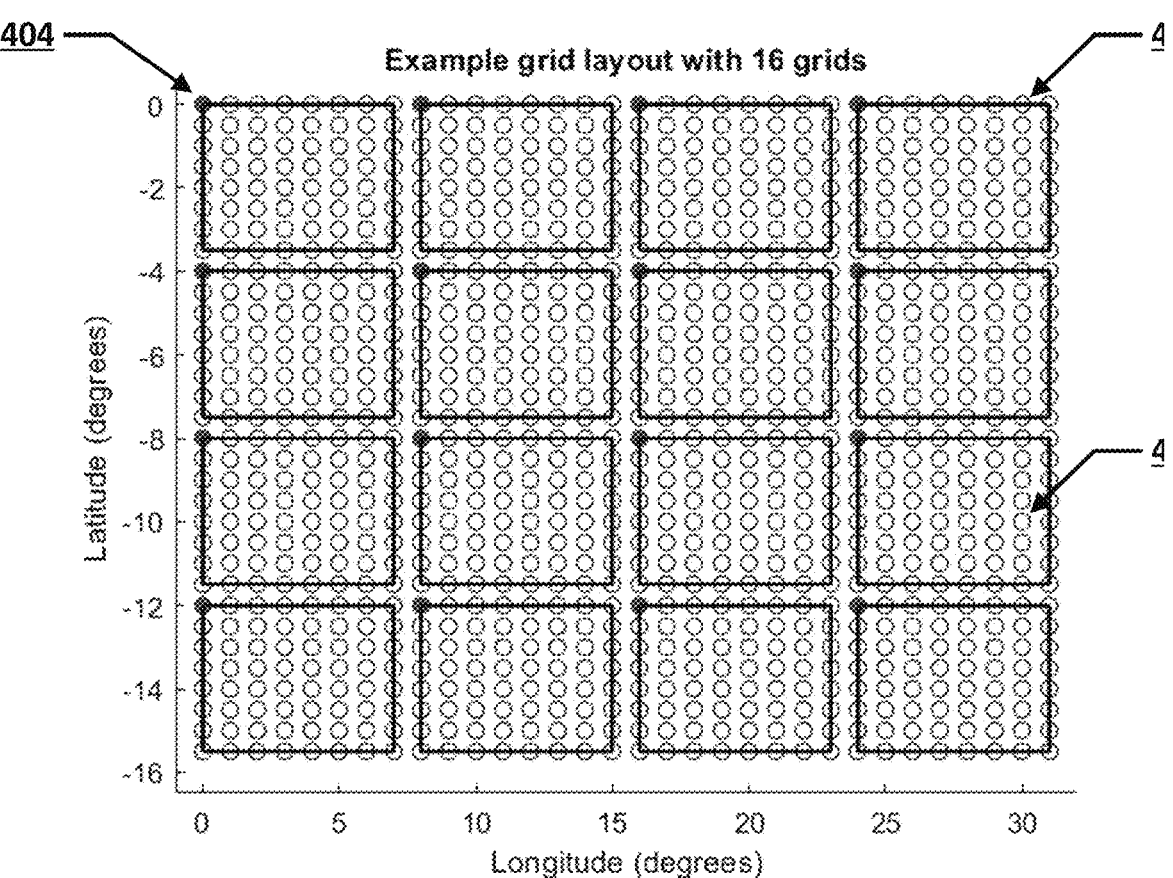
Figure 4B:
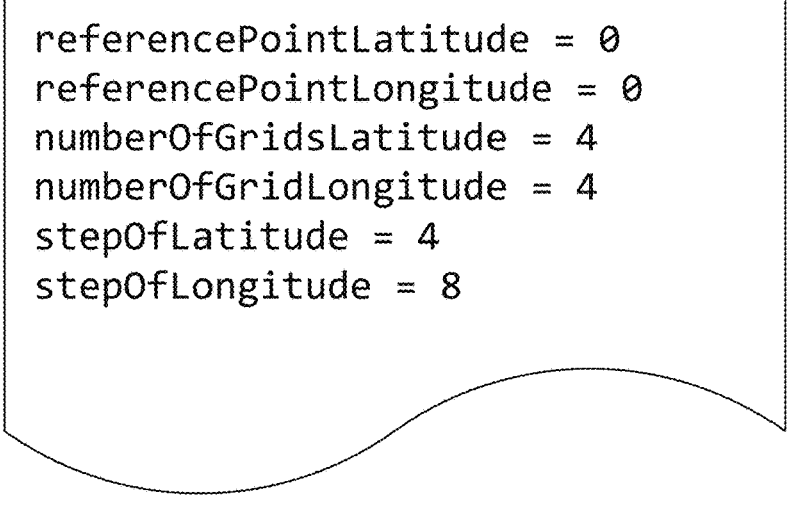
Figure 5:
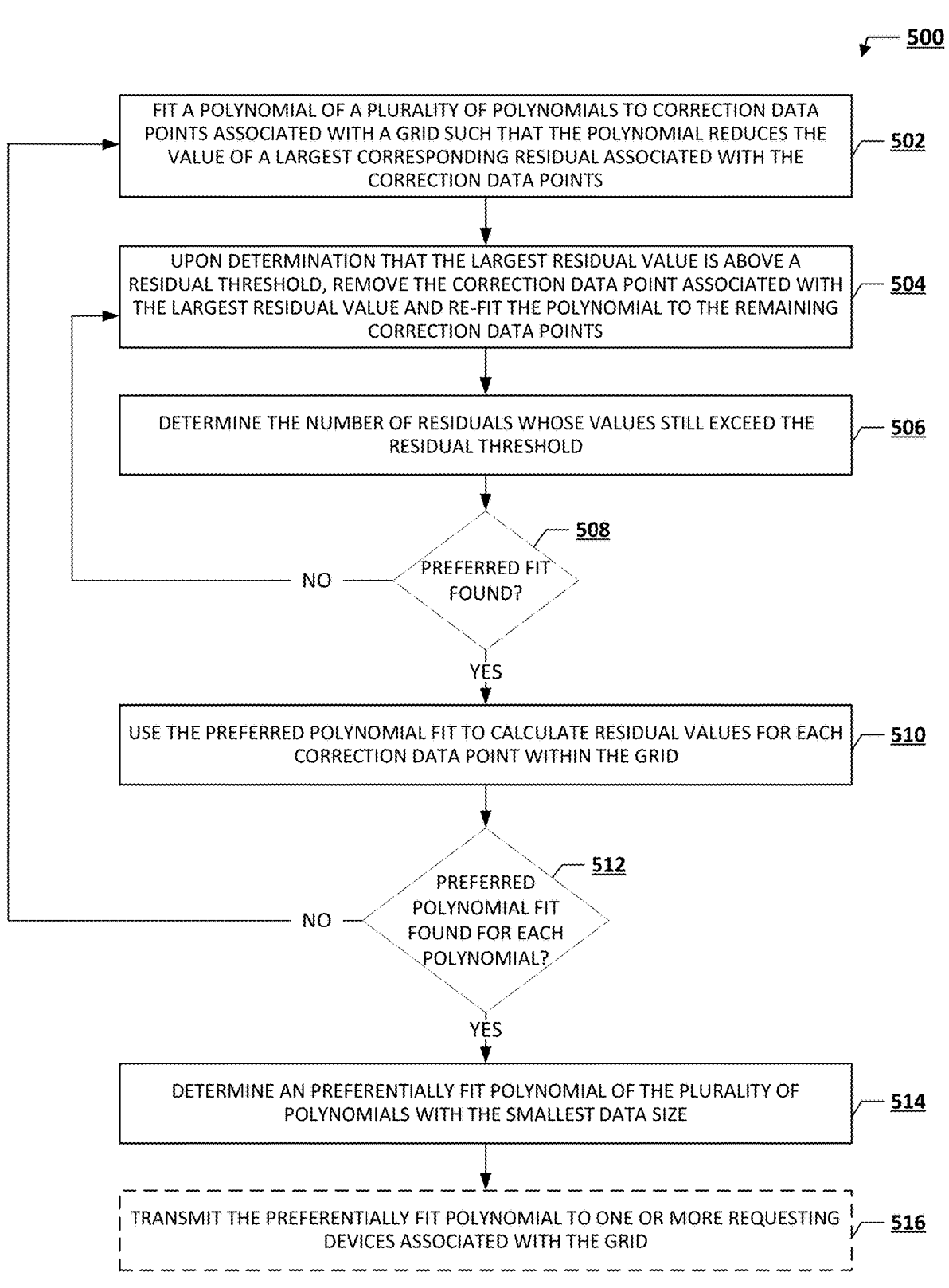

Having thus described example embodiments of the present disclosure in general terms, reference will now be made to the accompanying drawings, which are not necessarily drawn to scale, and wherein:

FIG. 1 is a system diagram illustrating the propagation of navigation signals from a navigation satellite to a navigation device, which is also in communication with a service provider;

FIG. 2 is a block diagram of an apparatus that may be specifically configured in accordance with an example embodiment of the present disclosure;

FIGS. 3A-3B illustrate example portions of grid data and a grid layout definition in accordance with an example embodiment of the present disclosure;

FIGS. 4A-4B illustrate an example grid layout as defined in a grid layout definition in accordance with an example embodiment of the present disclosure;

FIG. 5 is a block diagram of the operations performed, such as by the apparatus of FIG. 2 as embodied by a computing device of a service provider, in order to execute a polynomial model fitting algorithm in accordance with an example embodiment of the present disclosure; and FIG. 6 is a block diagram of the operations performed, such as by the apparatus of FIG. 2 as embodied by the computing device of the service provider, in order to dynamically augment ionospheric correction data in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

In the context of a satellite-based positioning technique, such as a GNSS-based positioning technique, a method, apparatus, and computer program product are provided in accordance with an example embodiment in order to facilitate the dynamic augmentation of atmospheric correction data associated with the position otherwise determined by the satellite-based positioning technique in order to compensate for at least some atmospheric delay and/or advance of the navigation signals propagating through the atmosphere. Although the method, apparatus and computer program product may be configured to dynamically augment correction data generated to correct for the delay and/or advance of navigation signals propagating through any of a variety of different atmospheric layers, the method, apparatus and computer program product of an example embodiment are configured to dynamically augment correction data generated to correct for the delay and/or advance of navigation signals propagating through the ionosphere. As described below, the method, apparatus and computer program product of an example embodiment are configured to provide for the augmentation of correction data generated to correct at least some of the atmospheric delay and/or advance experienced by navigation signals in a manner that is tailored for the requesting device, that is, the device requesting the correction, such as by defining a grid layout via which correction information is provided in a manner that is requested by the requesting device and/or by providing correction information based upon location parameters associated with the position for which corrections are sought. Embodiments of the present disclosure are configured to augment at least one of the size and/or update transmission rate of one or more portions of data related to the grid layout, and/or correction data associated with the navigation signals related to the requesting device. In various embodiments, the one or more portions of data related to the grid layout, and/or correction data can be configured as one or more respective data objects configured as digital messages defining the correction data and/or grid layout.

Embodiments of the present disclosure provide a number of technical advantages including the technical benefit of reducing bandwidth consumption of computing devices related to both the service providers (e.g., the service providers computing and transmitting the correction data) and requesting devices (e.g., navigation devices, smart phones, smartwatches, etc.). Furthermore, embodiments of the present disclosure provided the technical benefit of reducing the computational resources required by one or more navigation devices (e.g., consumer-grade computing devices comprising navigational components) to accurately calculate and employ correction data associated with navigation signals impacted by atmospheric delay and/or advance. Further still, embodiments of the present disclosure provide the technical benefit of increasing the efficiency of data transmissions executed by the computing devices associated with a service provider by dynamically reducing the size of one or more data messages associated with the correction data and/or positional data (e.g., grid layout data). It will be appreciated by one or more persons of ordinary skill in the art that the aforementioned technological improvements are applicable to a multitude of industries, and that applications of the various methods and operations described herein can be employed to improve technologies related to various industries such as, for example, telecommunication technologies, navigation technologies, logistic technologies, autonomous vehicle technologies, health and safety technologies, and/or the like.

For example, embodiments of the present disclosure provide means to dynamically adjust the output rates of atmospheric (e.g., ionospheric) correction data transmitted by a service provider by determining a dynamic correction data update rate. Employing the dynamic correction data update rate can directly reduce the bandwidth and computational resources needed to transmit and/or receive the correction data for both service providers and requesting devices. Additionally, embodiments of the present disclosure are configured to dynamically augment the contents of the "correction messages" comprising the atmospheric correction data such that the amount of transmitted correction data as well as the computational resources required to transmit the correction data can be minimized.

At all times, the ionospheric delay and changes in ionospheric activity impacting the delay behave differently around the globe, and, as such, the impact to the corresponding navigational signals varies from location to location. Additionally, the differences in the ionospheric activity are directly influenced by the Sun. Therefore, the ionosphere is much more active during the day than during the night. This change in ionospheric activity can be reflected in the update rates of the correction data associated with the navigational signals. For instance, as will be further discussed herein, the activity of the ionosphere is generally less active at night and does not impact navigational signals passing through the ionosphere as severely. Accordingly, as the ionosphere is more stable at night, fewer corrections need to be computed for the navigational signals and, therefore, fewer updates need to be made to the correction data. This generally means that correction data can be used by a requesting device for longer periods of time before the correction data needs to be updated and, as such, the correction data can be transmitted to a navigation device (e.g., by a service provider to a smartphone) less frequently without sacrificing positional accuracy for the navigation device.

In some embodiments, a decision to update the correction data (e.g., transmit updated correction data to one or more requesting devices) can be made, for example, by checking if an ionospheric activity model has changed sufficiently (e.g., has met a predetermined change threshold) from previously transmitted correction data to merit an update so as to avoid positional inaccuracies. For example, embodiments can track, store, and/or otherwise monitor one or more portions of data associated with previously transmitted correction data. If it is determined that one or more data values associated with the ionospheric activity model do not satisfy the predetermined change threshold (e.g., the data values have not changed substantially over a predetermined duration of time) and, accordingly, updated correction data based on the ionospheric activity model does not differ substantially from previously transmitted correction data, a service provider can decide not to transmit the updated correction data to one or more requesting devices.

Additionally or alternatively, in various embodiments, a decision to update the correction data (e.g., transmit updated correction data to one or more requesting devices) can be made by adjusting the dynamic correction data update rate based on current solar activity. For example, if a change in current, measured ionospheric activity is negligible and, as such, the corrections needed to mitigate the delays/advance of the navigational signals based on the change in ionospheric activity are minimal (e.g., do not satisfy a predetermined threshold), a service provider can decide not to calculate and/or transmit updated correction data to one or more requesting devices. Additionally or alternatively, in some embodiments, rather than utilizing current solar data, ionospheric activity models predicting upcoming solar activity and the effects of the predicted upcoming solar activity on a particular region can also be utilized to determine a rate at which to transmit updated correction data to one or more requesting devices.

Furthermore, in some embodiments, correction data update rates can also be considered when defining how different grids are laid out. For example, around the poles of the Earth, solar activity is generally much lower than near the equator. This fact can be utilized so that grid layout can be designed to consider that some geographical areas have much less ionospheric activity than others. As a non-limiting example, in various embodiments, a larger grid comprising fewer data points could be employed around the poles of the Earth to account for the lower relative solar activity around the poles. Furthermore, in addition to the larger, less dense grid layouts, a lower correction data update rate could be employed for geographic regions such as the poles due to the lesser impacts of the lower solar activity in such geographic regions.

In addition to dynamically adjusting the output rates of the correction data, embodiments of the present disclosure can also dynamically augment the size of the correction message associated with the correction data. The correction message associated with the correction data can be understood as a data object or data packet comprising one or more portions of data related to the correction data. A single ionospheric correction message can vary in size in multiple ways, and the size of the correction message directly corresponds to the bandwidth and computational resources needed to transmit and/or receive the correction message. One contributor to the size of the correction message is the format in which the associated correction data are presented. For example, if the ionospheric corrections are represented as a polynomial and residuals, then the degree of the polynomial and the residual values affect the size of the correction message.

One way in which to represent ionospheric correction data in a correction message is specified by the Long Term Evolution (LTE) positioning protocol (LPP). The LPP specification defines an ionospheric activity model similar to the QZSS model. In these ionospheric activity models, a grid is defined which is associated with an area of the Earth's surface at which ionospheric correction data will be valid. In this regard, a grid is a collection of points that cover an area of the Earth's surface. Each point, in turn, may be defined as a two-dimensional coordinate identifying a point on the Earth's surface, such as in terms of latitude and longitude. For each visible navigational satellite within the area, slant total electron count (STEC) values are defined with the STEC values represented as polynomials and residuals. The STEC value at any grid point can therefore be calculated based upon an evaluation of the polynomial and the residual at the respective grid point. Between the grid points, STEC values may be determined by interpolating between the STEC values at nearby grid points. As each grid is associated with only a certain area, multiple grids may be defined in order to cover larger portions of the Earth or to cover the entire Earth.

The LPP specification provides a plurality of models that can be used to represent the STEC polynomial, each with a different number of coefficients. STEC delay $$STEC_k^{PRN}$$

at grid point k can be calculated with each polynomial as:

1)
$$STEC_k^{PRN} = C_{00}^{PRN} + \delta STEC_k^{PRN},$$

2)
$$STEC_k^{PRN} = C_{00}^{PRN} + C_{01}^{PRN}(\varphi - \varphi_0) + C_{10}^{PRN}(\lambda - \lambda_0) + \delta STEC_k^{PRN}, \text{ or}$$

3)
$$STEC_k^{PRN} =$$
$$C_{00}^{PRN} + C_{01}^{PRN}(\varphi - \varphi_0) + C_{10}^{PRN}(\lambda - \lambda_0) + C_{11}^{PRN}(\lambda - \lambda_0)(\varphi - \varphi_0) + \delta STEC_k^{PRN},$$

where $$C_{XY}^{PRN}$$

are polynomial coefficients delivered as part of the correction message, $$\delta STEC_k^{PRN}$$

is the residual delivered as part of the correction message, $\varphi$ and $\lambda$ are the approximate latitude and longitude of the user location, and $\varphi_0$ and $\lambda_0$ are the reference latitude and longitude provided in the grid definition.

The corrections associated with navigation signals propagating through the ionospheric layer are provided to a navigation device in various manners depending on the ionospheric activity model. For example, corrections in the LPP format may be delivered to the navigation device in one or more different messages. A first message, such as a GNSS-SSR-CorrectionPoints message, provides the grid definition. The other two message types provide the polynomial, such as via a GNSS-SSR-STEC-Correction message, and the residuals, such as a GNSS-SSR-Gridded Correction message, for each navigation satellite. The navigation device may only need to receive the first message once, or at least a fewer number of times than the other two messages. In contrast, the messages that provide the polynomial and residuals for each navigation satellite are updated on a more frequent basis to reflect changes in the delays and advances of the navigation signals that are attributable to the ionosphere, as well as changes in the positions of the navigation satellites. The frequency with which the messages relating to the polynomial and the residuals are updated may vary, depending upon the rate of change of the delays or advances of the navigation signals that are attributable to the ionosphere and the rate of change in the position of the navigation satellites.

The information associated with the corrections may be in the form of TEC values for each of the one or more correction points of the grid. In this example embodiment, TEC values including both STEC values and VTEC values may be identified at each of the correction points. While the information associated with the corrections that is identified may be in the form of TEC values, the information associated with the correction points that is identified may be in any of a variety of other formats in other example embodiments with the information associated with the corrections intending in each instance to compensate for at least some of the atmospheric delay and/or advance of the navigation signals propagating through the atmosphere, such as the ionosphere. The information associated with the corrections that is identified and transmitted may be tailored to the requesting device, such as the navigation device 104, based upon a request received therefrom such that the information regarding the corrections that is most useful to the requesting device is identified and transmitted in an efficient manner.

Because the grids can be treated independent of each other, correction data transmission rates and/or correction message sizes can be defined for each grid individually. This allows the transmission rate to be determined only based on local data inside the grid area, not global data. Because total electron count (TEC) values are highly dependent on solar activity, TEC values are much larger during the day than during the night. This also means that absolute changes in values are much smaller, and therefore updating the correction data can be done less frequently overnight.

Because residuals are calculated as the difference between the polynomial and the actual STEC values, and because the residuals are used in various calculations of the methods and operations described herein, the degree of the polynomial has no effect on accuracy. The degree of the polynomial may therefore be reduced in order to decrease a corresponding correction message size as a smaller number of polynomial coefficients are stored in the correction message. However, in some circumstances, this may also increase the value of the residuals. Because residuals are encoded to the correction message in a way that values exceeding a certain limit use a larger amount of data (e.g., a larger number of bits, bytes, and/or a combination thereof), larger residual values may require a larger respective amount of data to be correctly represented, again increasing the message size. The optimal (e.g., size-wise) degree is, therefore, not simply the lowest degree polynomial.

The traditional way of fitting a polynomial to multiple data points is to use a least-squares approach. This minimizes the sum of squared errors at each data point. However, because residuals are also available, there is no need to minimize the error between the polynomial fit and the actual STEC values. Thus, the value of the residual becomes important if the value exceeds a specific residual threshold, otherwise the absolute value of the residual has no effect on calculating STEC delays. Therefore, an advantageous method to fit the polynomial would be to reduce or minimize the number of points where the residual threshold for the absolute value of the residual is exceeded. In various embodiments, the residual threshold can be determined based on a corresponding data size associated with a corresponding residual. For example, in embodiments that employ the LPP protocol, the residual threshold can be a limit determined based in part on a residual size that would require a larger amount of data (e.g., a larger number of bits), and therefore directly affect the message size.

Various embodiments of the present disclosure employ a polynomial fitting algorithm for fitting the polynomial (e.g., polynomial models (1), (2), and/or (3) provided supra) to reduce or minimize the number of residuals above the residual threshold. The algorithm can be generally executed as follows: (i) fit the polynomial to the data points associated with a grid so that the polynomial minimizes the value of the largest residual; (ii) if the largest residual value is above the residual threshold, remove the data point associated with the largest residual value and fit the polynomial again to the remaining data points; (iii) repeat step ii as many times as needed and, after each fit, count the number of residuals whose values still exceed the residual threshold until the number of residuals is minimized or at least reduced to an acceptable amount, and; (iv) use the optimal polynomial fit and calculate residual values for every data point, even those data points which were previously excluded from the polynomial fit. This algorithm ensures an improved polynomial fit and reduces or minimizes the total number of residuals having values that exceed the residual threshold.

Although the fitting algorithm may be applied to various polynomial models, it should be appreciated that the fitting algorithm provided supra reduces or minimizes the correction message size when one of a plurality of possible models (e.g., polynomial models (1), (2), or (3) provided supra) have been chosen. To choose between the plurality of polynomial models in this example embodiment, a polynomial model of each degree must be fit using the fitting algorithm supra and then the polynomial model with the smallest size can be chosen. In various embodiments, the provided fitting algorithm is done for each defined grid every time new updated correction data is received as well as for each navigational satellite within view of each respective grid.

In various embodiments, a navigation device can request information regarding corrections to compensate for delays or advances of the navigation signals attributable to the ionosphere from a service provider utilizing a dedicated message type (e.g., a message type formatted according to the LPP specification). For example, different message types may be utilized to request the grid definition as well as the polynomial and residuals for each navigation satellite within view of the navigation device. In one example embodiment, a GNSS-SSR-CorrectionPointsReq message, a GNSS-SSR-STEC-CorrectionReq message and a GNSS-SSR-Gridded-CorrectionReq message may be utilized to request the grid definition, the polynomial and the residuals, respectively. With respect to the message requesting the grid definition, such as the grid layout, from the service provider, the GNSS-SSR-CorrectionPointsReq message is currently defined by the LPP specification to include a single parameter that identifies the grid. As such, a navigation device that is seeking updated ionospheric correction data utilizing a gridded correction model must know in advance information regarding the available grids and the identification of the grid(s) that are relevant to the navigation device. Moreover, the grid layouts that are available for use with ionospheric correction models are generally static and inflexible.

When using a correction model that utilizes a grid approach, such as the LPP ionospheric corrections, it is imperative to have an initial knowledge of the total grid layout. In many circumstances, a requesting device receiving correction data from a service provider must generate a request for the total grid layout. In various embodiments, the requesting device can estimate which individual grids from the total grid layout the requesting device will require for positioning. As such, the associated computing devices associated with the correction model (e.g., computing devices associated with the service provider and/or requesting device) can transmit/receive requests for data associated with one or more specific grids comprised in the total grid layout based on one or more respective grid identifiers. However, the total grid layout may consist of a very large number of grids. As such, receiving and handling the total grid layout is not convenient, especially if the requesting devices have limited memory, computational capacity, or bandwidth limits on network transmissions.

In various embodiments, the grids are defined as a set of grid points that can be represented, for example, as either an array or a list, and both approaches define a reference point. In embodiments that utilize arrays, the reference point may indicate a predefined reference point, such as the north-west corner of a linear grid. In embodiments that utilize lists, the reference point may define the first point in the grid, and the rest of the points are given as list items describing differences in latitude and longitude with respect to the previous point. In both approaches, the distances between individual grid points in a grid are limited due to the value ranges of the parameters in the grid definition messages. Furthermore, in some protocols, the maximum number of points one grid can contain is limited. For example, in embodiments that employ LPP, the maximum number of points one grid can contain is limited to sixty-four (64) points. Because of these two limitations, one grid cannot be used to cover a very large area (e.g., such as employing one grid to define global coverage) and, as such, multiple grids must be used to define large areas.

Using traditional methods, if a requesting device requires the total grid layout the receiving device must receive an individual message corresponding to each respective grid in the total grid layout. For example, if the total grid layout has global coverage and has latitude and longitude step sizes of one degree in each direction, there would be roughly a thousand individual grids. Particularly, due to the aforementioned limitation on the number of grid points allowed per individual grid, many individual grids must be used to provide accurate corrections globally. This problem cannot be overcome simply by increasing the step size between grid points as this would have an adverse effect on the accuracy of the correction data.

Embodiments of the present disclosure provide an abbreviated method for transmitting multiple grids and, as such, can reduce the size of the transmitted grid layout data. In this regard, various embodiments can generate and employ a new grid layout definition type which can be used in accordance with, or in lieu of, LPP and/or other protocols. This new grid layout definition type can be used to describe a grid layout comprising multiple individual grids within a single message, rather than the traditional method of defining one grid per individual message. As such, requesting devices can make an initial request for a single message configured as this grid layout definition type and, based on the grid layout definition, the requesting devices can estimate which individual grids are relevant to the requesting device. Based on the data comprised within the grid layout definition, the requesting device can request atmospheric correction data for the relevant grids.

In various embodiments, a single grid layout definition can define the total grid layout. In various other embodiments, the single grid layout definition can define a particular subset of the total grid layout. Additionally, various embodiments can configure this single grid layout definition in accordance with the LPP specification, examples of which are described below.

Referring now to FIG. 1, a system that is configured to determine a position, such as the position of a navigation device 104, utilizing a satellite-based positioning technique, such as a GNSS-based positioning technique, is depicted. In this regard, a navigation satellite 102 is depicted that broadcasts data including navigation data to one or more navigation devices. Although a single navigation satellite is depicted for purposes of illustration, the navigation satellite is typically one of a constellation of navigation satellites that orbit the Earth. For example, the navigation satellite may be a GNSS satellite, such as a GPS satellite, a GLONASS satellite, a BeiDou satellite, a Galileo satellite or a regional SBAS satellite. Regardless of the type of navigation satellite, the navigation satellite provides navigation signals that include a ranging code and ephemeris data interleaved with the ranging code that defines the orbit of the navigation satellite during the lifetime of the ephemeris data, such as for a predefined period of time, e.g., 2 to 4 hours. Based upon the ephemeris data, the position of the navigation satellite may be determined within the predefined period of time.

The navigation device 104 that receives the data, including the navigation data, broadcast by the navigation satellite 102 may include a receiver, such as a GNSS receiver, for receiving the signals transmitted by the navigation satellite. The navigation device 104 may be embodied by any of a variety of devices including, for example, a mobile device, such as mobile terminal, e.g., a personal digital assistant (PDA), mobile telephone, smart phone, personal navigation device, smart watch, tablet computer or any combination of the aforementioned and other types of portable computing devices, or a positioning or navigation system such as a positioning or navigation system onboard a vehicle, e.g., an automobile, a truck, a boat or other marine vehicle, a drone, a train or a satellite. Although only a single navigation device 104 is depicted in FIG. 1 for purposes of illustration, a plurality of navigation devices may receive the navigation data from the navigation satellite 102 in other embodiments.

Based at least in part upon the navigation data, the orbit and/or the clock offset of the navigation satellite may be predicted at one or more points in time within a prediction interval. The prediction interval may extend temporally beyond a predefined period of time during which the ephemeris data is valid so as to predict the position of the navigation satellite at each of a plurality of points in time following the lifetime of the ephemeris data. Although the position of the navigation satellite may be predicted at the plurality of points in time within the prediction interval in any of a variety of different manners, the position of the navigation satellite may be predicted utilizing a prediction algorithm, such as a prediction algorithm that provides an ephemeris extension of the ephemeris data.

In order to more accurately determine a position, such as the position of the navigation device 104, the system also includes a service provider 106. In the illustrated embodiment, the service provider 106 is in communication with a requesting device and is configured to provide information to the requesting device regarding corrections to be made to compensate for a source of error within the navigation signals and/or the position that is determined. In this regard, the service provider 106 of an example embodiment is configured to provide information to the requesting device regarding corrections to compensate for at least some atmospheric delay and/or advance of the navigation signals transmitted by a navigation satellite 102, such as during the propagation of the navigation signals through the ionosphere. Although depicted as a discrete element, the service provider 106 of other example embodiments may be provided by a cloud-based computing system, a server system, a distributed computing system, and/or the like.

Although described herein by way of example, but not of limitation, with respect to communication between the service provider 106 and a navigation device 104 in order to improve the position otherwise determined for the navigation device utilizing a satellite-based positioning technique, the service provider may be in communication with and may provide information regarding corrections to be made to various other devices or systems, such as a data provider, a telecommunications provider or the like. As such, the requesting device may be a navigation device in some embodiments, but may be other devices or systems in other embodiments, such as a data provider, a telecommunications provider or the like. In an instance in which the requesting device is a data provider, a telecommunications provider or the like, the service provider 106 may provide information regarding corrections to be made at various points within a region serviced by the data provider, the telecommunications provider or the like such that the data provider, the telecommunications provider or the like can, in turn, provide the information regarding the corrections to be made to downstream devices located within the region such that the downstream devices can compensate for at least some atmospheric delay and/or advance of the navigation signals transmitted by a navigation satellite 102. Additionally or alternatively, the data provider, the telecommunications provider or the like may take into account the information regarding the corrections to be made in relation to its communication with a downstream device. In some embodiments, the requesting device and/or the service provider may be a cloud-based computing device.

Referring now to FIG. 2, an apparatus 200 that may be configured to facilitate the correction of the position that has been determined, such as for a navigation device 104, so as to compensate for at least some atmospheric delay and/or advance of the navigation signals propagating through the atmosphere, such as the ionosphere, is depicted. The apparatus may be embodied by a requesting device, such as the navigation device, a data provider, a telecommunications provider or the like, or may be otherwise associated with the requesting device, such as in an embodiment in which the apparatus is embodied by a computing device in communication with the requesting device that is configured to determine a position, such as the position of the navigation device, or at least corrections to the position. In one embodiment in which the apparatus is embodied by or associated with the requesting device, the apparatus is configured to enable a customized request for corrections to be made, with the corrections being for at least some atmospheric delay and/or advance of the navigation signals relied upon by a satellite-based positioning technique to determine a position, such as the position of the navigation device. In another embodiment in which the apparatus is embodied by or associated with the requesting device, the apparatus is configured to enable a request for corrections to be made by the requesting device with the corrections being for at least some of the atmospheric delay and/or advance experienced by the navigation signals and with the request being at least partially based upon one or more location parameters associated with the position of interest, such as the position of the navigation device.

Alternatively, the apparatus 200 of other example embodiments may be embodied by a computing device, such as a server in a server system, of a service provider 106, such as a service provider configured to support satellite-based positioning techniques, such as GNSS-based positioning techniques. In one embodiment in which the apparatus is embodied by or associated with a computing device of the service provider, the apparatus is configured to respond to a customized request for corrections from a requesting device, with the corrections being for at least some atmospheric delay and/or advance of the navigation signals relied upon to determine a position, such as the position of the navigation device, in accordance with a satellite-based positioning technique. In another embodiment in which the apparatus is embodied by or associated with a computing device of the service provider, the apparatus is configured to respond to a request for corrections from a requesting device with the corrections being for at least some of the atmospheric delay and/or advance experienced by the navigation signals and with the request being at least partially based upon one or more location parameters associated with the position for which corrections are sought.

In conjunction with the embodiments in which the apparatus 200 is embodied by or associated with a requesting device as well as the embodiments in which the apparatus is embodied by or associated with a computing device of a service provider 106, the apparatus 200 includes, is associated with or is in communication with processing circuitry 202, a memory device 204 and a communication interface 206, as shown in FIG. 2. In some embodiments, the processing circuitry (and/or co-processors or any other processors assisting or otherwise associated with the processing circuitry) can be in communication with the memory device 204 via a bus for passing information among components of the apparatus 200. The memory device 204 can be non-transitory and can include, for example, one or more volatile and/or non-volatile memories. In other words, for example, the memory device 204 may be an electronic storage device (for example, a computer readable storage medium) comprising gates configured to store data (for example, bits) that can be retrievable by a machine (for example, a computing device like the processing circuitry). The memory device 204 can be configured to store information, data, content, applications, instructions, or the like for enabling the apparatus to carry out various functions in accordance with an example embodiment of the present disclosure. For example, the memory device 204 can be configured to buffer input data for processing by the processing circuitry 202. Additionally or alternatively, the memory device 204 can be configured to store instructions for execution by the processing circuitry 202.

The processing circuitry 202 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 202 can include one or more processing cores configured to perform independently. A multi-core processor can enable multiprocessing within a single physical package. Additionally or alternatively, the processing circuitry 202 can include one or more processors configured in tandem via the bus to enable independent execution of instructions, pipelining and/or multithreading.

In an example embodiment, the processing circuitry 202 can be configured to execute instructions stored in the memory device 204 or otherwise accessible to the processing circuitry 202. Alternatively or additionally, the processing circuitry 202 can be configured to execute hard coded functionality. As such, whether configured by hardware or software methods, or by a combination thereof, the processing circuitry 202 can represent an entity (for example, physically embodied in circuitry) capable of performing operations according to an embodiment of the present disclosure while configured accordingly. Thus, for example, when the processing circuitry 202 is embodied as an ASIC, FPGA or the like, the processing circuitry 202 can be specifically configured hardware for conducting the operations described herein. Alternatively, as another example, when the processing circuitry 202 is embodied as an executor of software instructions, the instructions can specifically configure the processing circuitry 202 to perform the algorithms and/or operations described herein when the instructions are executed. However, in some cases, the processing circuitry 202 can be a processor of a specific device (for example, a computing device) configured to employ an embodiment of the present disclosure by further configuration of the processor by instructions for performing the algorithms and/or operations described herein. The processing circuitry 202 can include, among other things, a clock, an arithmetic logic unit (ALU) and/or one or more logic gates configured to support operation of the processing circuitry 202.

The apparatus 200 of an example embodiment can also include the communication interface 206. The communication interface 206 can be any means such as a device or circuitry embodied in either hardware or a combination of hardware and software that is configured to receive and/or transmit data from/to other electronic devices in communication with the apparatus 200, such as by providing for communication with the service provider 106 and/or a navigation device 104 or other requesting device of the service provider 106. The communication interface 206 can be configured to communicate in accordance with various wireless protocols including Global System for Mobile Communications (GSM), such as but not limited to Long Term Evolution (LTE). In this regard, the communication interface 206 can include, for example, an antenna (or multiple antennas) and supporting hardware and/or software for enabling communications with a wireless communication network. Additionally or alternatively, the communication interface 206 can include the circuitry for interacting with the antenna(s) to cause transmission of signals via the antenna(s) or to handle receipt of signals received via the antenna(s). In some environments, the communication interface 206 can alternatively or also support wired communication.

FIG. 3A depicts the structure of an array message 302 defining an individual grid configured using a traditional array approach (e.g., GNSS-SSR-ArrayOfCorrectionPoints-r16). Specifically, FIG. 3A depicts a portion of a traditional message comprising grid data in an abstract syntax notation one (ASN.1) messaging format. Particularly, FIG. 3A depicts the message type GNSS-SSR-ArrayOfCorrection- Points-r16 as defined in the LPP specification. As described supra, one of the limiting factors of such a message is that the total number of points per grid must be limited to 64 points. As such, multiple messages of this type must be generated and transmitted in order to define a large grid layout covering a large geographical area.

FIG. 3B depicts a grid layout definition 304 generated in accordance with various embodiments of the present disclosure. For example, the grid layout definition 304 depicted in FIG. 3B can be generated by the apparatus 200 (e.g., by way of the processing circuitry 202) and can be transmitted by the apparatus 200 (e.g., by way of the communication interface 206) to one or more computing devices (e.g., one or more requesting devices). As shown, the parameters in the array message 302, numberOfStepsLatitude-r16 and numberOfStepsLongitude-r16 (e.g., as depicted in FIG. 3A), are replaced with numberOfGridsLatitude-r16 and numberOfGridsLongitude-r16 in the grid layout definition 304 and indicate how many grids are in the latitudinal and longitudinal directions, respectively. The parameters stepOfLatitude-r16 and stepOfLongitude-r16 indicate the difference between the reference points of each grid in the latitudinal and longitudinal directions, respectively. The values of referencePointLatitude-r16 and referencePointLongitude-r16 indicate a predefined reference point, such as the northwest corner, of the first grid. As such, in various embodiments, a single grid layout definition 304 can define a total, global grid layout. Additionally or alternatively, in various other embodiments, the grid layout definition 304 can define a particular subset of the total grid layout such as, for example, a predetermined plurality of individual grids. Additionally, various embodiments can configure the grid layout definition 304 in accordance with the LPP specification.

It should be noted that the parameter values and the parameter value ranges serve merely as an example and the grid layout definition 304 can be configured as necessary depending on the use case, the size of the grid layout requested by the requesting device, and/or the computational capabilities and/or constraints of the requesting device. In various embodiments, the grid layout definition 304 can be transmitted as part of a grid layout definition message generated in response to a request generated by a requesting device, navigation device (e.g., navigation device 104), and/or the like. Additionally or alternatively, in various embodiments, the grid layout definition 304 can be transmitted as part of a correction message associated with one or more portions of correction data being transmitted to a requesting device, navigation device (e.g., navigation device 104), and/or the like. The information associated with the grid layout and/or correction message that is identified and transmitted may be tailored to the requesting device, such as the navigation device 104, based upon the request received therefrom such that the information regarding the grid layout and/or correction data that is most useful to the requesting device is identified and transmitted in an efficient manner.

FIGS. 4A and 4B further illustrate the technical benefits of the grid layout definition 304 defining a grid layout composed of multiple grids. For example, FIG. 4A depicts a grid layout consisting of sixteen (16) individual grid(s) 402 as defined by a grid layout definition 304. The depicted individual grid(s) 402 are linear grids that are evenly spaced with each individual grid 402 having the same number of correction points 406 as well as the same step size. The solid circles at the upper left-most corner of each individual grid 402 indicate the reference point(s) 404 of each individual grid 402. The remaining hollow circles indicate the remaining correction point(s) 406 of the individual grid(s) 402. The squares are drawn to distinguish between the individual grids 402.

Using this proposed approach, the grid layout depicted in FIG. 4A can be defined and transmitted in a single grid layout definition 304. In this regard, FIG. 4B depicts multiple parameter values that can be used in such a grid layout definition 304 corresponding to the grid layout in FIG. 4A. Specifically, FIG. 4B describes one or more parameter values including, but not limited to: referencePointLatitude=0; referencePointLongitude=0; numberOfGridsLatitude=4; numberOfGridsLongitude=4; stepOfLatitude=4; and/or stepOfLongitude=8. It will be appreciated that the grid layout as depicted in FIG. 4A can be transmitted in a single grid layout definition 304 without having to send the grid definitions for each individual grid 402 separately. As such, the grid layout definition 304 can be used to deliver data related to multiple individual grids 402 at the same time.

Referring now to FIG. 5, the operations are performed, such as by the apparatus 200 of FIG. 2, in accordance with an example embodiment in which the apparatus 200 is embodied by, or associated with, a service provider such as the service provider 106. In this example, the apparatus 200 is configured to execute a method 500 for employing a polynomial fitting algorithm configured to determine a preferred or optimal polynomial model for generating one or more portions of correction data associated with one or more correction points (e.g., correction point(s) 406) comprised within one or more individual grids (e.g., individual grids 402). Such a polynomial model can be used to generate correction data configured to compensate for at least some of the atmospheric delay (e.g., ionospheric delay) and/or advance experienced by navigation signals propagating through the atmosphere, such as the ionosphere.

At block 502 of FIG. 5, the apparatus 200 includes means, such as the processing circuitry 202, memory device 204, and/or the like, configured to fit a polynomial of a plurality of polynomials to one or more correction data points associated with a grid such that the polynomial reduces or minimizes the value of a largest corresponding residual associated with the correction data points. In some embodiments, the operations executed in block 502 can be configured as a Chebyshev regression computation, where the Chebyshev regression computation is formulated as a linear programming problem by the processing circuitry 202. However, other techniques for fitting the polynomial to one or more correction data points may be utilized in other example embodiments. The plurality of polynomials can correspond to the polynomial models previously described herein or to other types of polynomial models. With respect to the three (3) polynomial models described supra by way of example, the polynomial models can be improved or optimized for purposes of generating correction data according to various embodiments of the present disclosure. The three polynomial models can be used to represent the STEC polynomial, each with a different number of coefficients. STEC delay $$STEC_k^{PRN}$$

at grid point k can be calculated with each polynomial as:

1)

-continued
$$STEC_k^{PRN} = C_{00}^{PRN} + \delta STEC_k^{PRN},$$

2)

$$STEC_k^{PRN} = C_{00}^{PRN} + C_{01}^{PRN}(\varphi - \varphi_0) + C_{10}^{PRN}(\lambda - \lambda_0) + \delta STEC_k^{PRN}, \text{ or}$$

3)

$$STEC_k^{PRN} =$$

$$C_{00}^{PRN} + C_{01}^{PRN}(\varphi - \varphi_0) + C_{10}^{PRN}(\lambda - \lambda_0) + C_{11}^{PRN}(\lambda - \lambda_0)(\varphi - \varphi_0) + \delta STEC_k^{PRN},$$

where $$C_{XY}^{PRN}$$

are polynomial coefficients delivered as part of the correction message, $$\delta STEC_k^{PRN}$$

is the residual delivered as part of the correction message, $\varphi$ and $\lambda$ are the approximate latitude and longitude of the user location, and $\varphi_0$ and $\lambda_0$ are the reference latitude and longitude provided in the grid definition (e.g., grid layout definition 304). For each visible navigational satellite 102 within the area, STEC values are defined with the STEC values represented as polynomials and residuals. The STEC value at any grid point (e.g., correction point(s) 406) can therefore be calculated based upon an evaluation of the polynomial and the residual at the respective grid point (e.g., correction point(s) 406). Between the grid points, STEC values may be determined by interpolating between the STEC values at nearby grid points. As each grid is associated with only a certain area, multiple grids may be defined in order to cover larger portions of the Earth or to cover the entire Earth.

At block 504, the apparatus 200 includes means, such as the processing circuitry 202, memory device 204, and/or the like, configured to, upon determination that the largest residual value is above a residual threshold, remove the correction data point associated with the largest residual value and re-fit the polynomial to the remaining correction data points. In one or more embodiments, a residual threshold value can be predetermined such that an acceptable deviation from the polynomial curve can be defined for the correction data points. As such, if the processing circuitry 202 determines that the largest calculated residual has a value that exceeds the predetermined residual threshold, the corresponding correction data point associated with the largest residual value can be removed from the rest of the correction data points associated with the grid.

At block 506, the apparatus 200 includes means, such as the processing circuitry 202, memory device 204, and/or the like, configured to determine the number of residuals whose values still exceed the residual threshold. As shown, certain operations of the method 500 are iterative and certain blocks (e.g., blocks 504 through 508) can be repeated. As such, referring to the preceding block 504 and the current block 506, the number of residuals exceeding the residual threshold is expected to decrease each time the operations associated with block 504 are executed.

At block 508, the apparatus 200 includes means, such as the processing circuitry 202, memory device 204, and/or the like, configured to determine if a preferred polynomial fit, such as an optimal polynomial fit, has been found. For example, the processing circuitry 202 may be configured to determine that if the combined count of previously excluded residuals and residuals exceeding the residual threshold increases from one iteration to a next iteration, that the first polynomial fit corresponding is preferred, such as by being optimal size-wise. As described herein, residual values and the relative size of a polynomial (e.g., the degree of the polynomial) have a direct relationship to the size of a correction message. Thus, it is desirable to identify a polynomial fit that will reduce the size of the correction message without sacrificing the positional accuracy of, for example, a navigation device 104.

At block 510, the apparatus 200 includes means, such as the processing circuitry 202, memory device 204, and/or the like, configured to use the preferred polynomial fit determined in blocks 504 through 508 to calculate residual values for correction data points, such as for each correction data point, within the grid. In various embodiments, even those correction data points which were previously excluded from the polynomial fit for being associated with residuals whose values exceeded the residual threshold are considered with respect to the calculation of residual values. In this way, the method 500 ensures a preferred polynomial fit while reducing, e.g., minimizing, the total number of residuals having values that exceed the residual threshold.

At block 512, the apparatus 200 includes means, such as the processing circuitry 202, memory device 204, and/or the like, configured to determine if the preferred polynomial for each of the plurality of polynomials has been determined. For example, each of the three (3) polynomial models defined supra may be optimized via the operations described in blocks 502 through 510. If it is determined that a preferred polynomial fit has not been found for one or more polynomials of the plurality of polynomials, the method 500 returns to block 502. However, if it is determined that a preferred polynomial fit has been found for each polynomial of the plurality of polynomials, the method 500 proceeds to block 514.

At block 514, the apparatus 200 includes means, such as the processing circuitry 202, memory device 204, and/or the like, configured to determine the preferred polynomial, e.g., the optimally fit polynomial, of the plurality of polynomials that is associated with the smallest data size. For example, the processing circuitry 202 can be configured to compare the projected size of each of the preferred polynomials from the plurality of polynomials to determine which polynomial, such as the polynomial associated with the smallest data size, should be transmitted to one or more requesting devices. Residual values and the relative size of a polynomial (e.g., the degree of the polynomial) have a direct relationship to the size of a correction message. In turn, the size of a correction message has a direct relationship to the bandwidth consumption and the consumption of computational resources associated with computing devices associated with the service provider (e.g., service provider 106) and/or the requesting device (e.g., navigation device 104). It may therefore be desirable in at least some embodiments to identify a polynomial model whose fit will reduce the size of the correction message without sacrificing the positional accuracy of, for example, a navigation device 104.

At block 516, the apparatus 200 includes means, such as the processing circuitry 202, communication interface 206, and/or the like, configured to transmit the preferentially fit polynomial to one or more requesting devices associated with the grid to facilitate the correction of one or more navigational signals delayed by atmospheric activity (e.g., ionospheric activity). In various embodiments, the operations associated with block 516 are optional and the transmitting of the preferentially fit polynomial to the one or more requesting devices associated with the grid to facilitate the correction of one or more navigational signals delayed by ionospheric activity is executed dynamically.

It should be appreciated that the method 500 reduces, e.g., minimizes, the correction message size when the polynomials of the plurality of polynomials (e.g., polynomial models (1), (2), or (3) listed supra) have been optimized and the polynomial with the smallest relative size is chosen. In various embodiments, the method 500 is executed for each defined grid every time new updated correction data related to an ionospheric activity model is received and/or for each navigational satellite within view of each respective grid.

Referring now to FIG. 6, the operations are performed, such as by the apparatus 200 of FIG. 2, in accordance with an example embodiment in which the apparatus 200 is embodied by, or associated with, a service provider such as the service provider 106. In this example, the apparatus 200 is configured to execute a method 600 for dynamically augmenting ionospheric correction data by reducing the size of one or more correction messages and/or adjusting the dynamic correction data update rate associated with the one or more correction messages.

At block 602, the apparatus 200 includes means, such as the processing circuitry 202, memory device 204, communication interface 206, and/or the like, configured to receive, from a requesting device, a request for grid layout data, where the grid layout data is associated with one or more geographical areas experiencing at least some atmospheric delay incurred with a satellite-based positioning technique. For example, a requesting device such as, for example, the navigation device 104 can transmit a request for grid layout data to a service provider (e.g., service provider 106). The request may be configured in various manners, but, in one embodiment, the request provides information regarding the position for which corrections are sought such as, for example, information regarding the estimated current position of the navigation device 104. The position for which corrections are sought may be defined in various manners including, for example, by one or more location parameters associated with the position at which the corrections are sought, such as the estimated current position of the navigation device 104. Various location parameters may be provided including, for example, the latitude and longitude of the estimated current position of the navigation device.

In various embodiments, the apparatus 200 associated with the requesting device can configure the request to identify the size of the grid and, in turn, the area within the perimeter of the grid for which the information associated with the corrections is sought. Alternatively, the grid for which the information associated with the corrections is sought may be of a predefined size with the grid positioned relative to the position for which location parameters are provided, such as by being centered about the position for which location parameters are provided. In this alternative embodiment, the request need not include the size of the grid.

At block 604, the apparatus 200 includes means, such as the processing circuitry 202, memory device 204, communication interface 206, and/or the like, configured to transmit, in response to the request for grid layout data, a grid layout definition message, where the grid layout definition message comprises a grid layout definition (e.g., grid layout definition 304) associated with one or more portions of grid layout data associated with one or more specific locations within the one or more geographical areas. In various embodiments, the grid layout data comprised in the grid layout definition message comprises data associated with one or more individual grids, where the one or more individual grids comprise one or more correction data points associated with the one or more geographical areas.

In various embodiments, the grid layout definition 304 is generated using an abbreviated method for transmitting multiple individual grids and, as such, can reduce the size of the transmitted grid layout data and/or grid layout definition message. This grid layout definition 304 can be used to describe and transmit a grid layout comprising multiple individual grids within a single grid layout definition message in contrast to the traditional method of defining one individual grid per individual message and transmitting a plurality of messages in order to define the grid layout.

In various embodiments, a single grid layout definition 304 can define a total, global grid layout. In various other embodiments, the grid layout definition 304 can define a particular subset of the total grid layout such as, for example, a predetermined plurality of individual grids. Additionally, various embodiments can configure the grid layout definition 304 in accordance with the LPP specification. In some embodiments, the grid layout definition 304 can be generated in response to a request generated by a requesting device. In this regard, the request can be configured to include one or more correction data points within a perimeter of the grid for which corrections are to be made. The points may be defined in various manners, including as an array or as a list of points as described supra. Regardless of the manner in which the correction points are identified, the points generally extend throughout and cover the grid for which corrections are sought.

At block 606, the apparatus 200 includes means, such as the processing circuitry 202, memory device 204, and/or the like, configured to generate correction data based in part on the grid layout data, where the correction data is configured to correct the at least some atmospheric delay (e.g., ionospheric delay) incurred with the satellite-based positioning technique. In various embodiments, generating the correction data comprises applying a polynomial model to one or more correction data points comprised in the one or more individual grids defined by the grid layout data. Generating the correction data comprises executing a polynomial fitting algorithm (e.g., as described by the method 500 in FIG. 5) to determine an optimal polynomial model of a plurality of polynomial models. The plurality of models can comprise, but is not limited to, the polynomial models (1), (2), and (3) defined supra. In various embodiments, the polynomial fitting algorithm is executed upon a determination that an ionospheric activity model associated with service provider 106 and/or the requesting device has been updated. In various embodiments, the ionospheric activity model describes ionospheric activity data related to the one or more geographical areas experiencing the at least some atmospheric delay (e.g., ionospheric delay) incurred with the satellite-based positioning technique. In one or more embodiments, the ionospheric activity data comprises at least one of one or more portions of current ionospheric activity data, one or more portions of predicted ionospheric activity data, one or more portions of current solar activity data, or one or more portions of predicted solar activity data. Additionally or alternatively, in various embodiments, the polynomial fitting algorithm is executed upon a determination that a navigation satellite 102 associated with the satellite-based positioning technique is within view of the one or more individual grids 402.

In some embodiments, determining the optimal polynomial model is based in part on a comparison of a corresponding data size associated with each polynomial model of the plurality of polynomial models, where the corresponding data size of the optimal polynomial model is smaller relative to the respective corresponding data size of each of the other polynomials of the plurality of polynomial models. For example, the processing circuitry 202 can compare the projected size of each of the optimized polynomials from the plurality of polynomials to determine which polynomial should be transmitted to one or more requesting devices to facilitate the correction of one or more navigational signals being impacted by ionospheric activity. Residual values associated with the polynomial as well as the relative size of a polynomial (e.g., the degree of the polynomial) have a direct relationship to the size of a correction message. In turn, the size of a correction message has a direct relationship to the bandwidth consumption and the consumption of computational resources associated with computing devices associated with the service provider (e.g., service provider 106) and/or the requesting device (e.g., navigation device 104). It is therefore desirable to identify a polynomial model whose fit will reduce the size of the correction message without sacrificing the positional accuracy of, for example, a navigation device 104.

At block 608, the apparatus 200 includes means, such as the processing circuitry 202, memory device 204, and/or the like, configured to generate one or more correction messages, where the one or more correction messages comprise at least a portion of the correction data. The correction message associated with the correction data can be a data object or data packet comprising one or more portions of data related to the correction data. The correction message can vary in size in multiple ways, and the size of the correction message directly corresponds to the bandwidth and computational resources needed to transmit and/or receive the correction message. One contributor to the size of the correction message is the format in which the associated correction data are presented. For example, if the ionospheric corrections are represented as a polynomial and residuals, then the degree of the polynomial and the residual values affect the size of the correction message. As described herein, one way in which to represent ionospheric correction data in a correction message is specified by the LPP. The LPP specification defines an ionospheric activity model similar to the QZSS model. Additionally or alternatively, in some embodiments, the one or more correction messages generated by the apparatus 200, can comprise the grid layout definition 304 requested by the requesting device.

At block 610, the apparatus 200 includes means, such as the processing circuitry 202, memory device 204, and/or the like, configured to determine a dynamic correction data update rate. For example, the apparatus, 200, such as the processing circuitry 202, may be configured to dynamically adjust the output rates of atmospheric (e.g., ionospheric) correction data transmitted by a service provider 106 by determining a dynamic correction data update rate. Employing the dynamic correction data update rate can directly reduce the bandwidth and computational resources needed to transmit and/or receive the correction data for both service providers and requesting devices. In various embodiments, the dynamic correction data update rate is based in part on the ionospheric activity model. For instance, the dynamic correction data update rate can be based in part on a predetermined change threshold associated with one or more data values associated with the ionospheric activity data comprised in the ionospheric activity model. If it is determined that one or more data values associated with the ionospheric activity model do not satisfy the predetermined change threshold (e.g., the data values have not changed substantially over a predetermined duration of time) and, accordingly, the updated correction data based on the ionospheric activity model does not differ substantially from previously transmitted correction data, a service provider 106 can decide not to transmit the updated correction data to one or more requesting devices.

Additionally or alternatively, the dynamic correction data update rate can be based in part on a time of day relative to one or more specific locations within the one or more geographical areas related to the grid layout data. For instance, the activity of the ionosphere is generally less active at night and does not impact navigational signals passing through the ionosphere as severely. Accordingly, as the ionosphere is more stable at night, fewer corrections need to be computed for the navigational signals and, therefore, fewer updates need to be made to the correction data. This generally means that correction data can be used by a requesting device for longer periods of time before the correction data needs to be updated and, as such, the correction data can be transmitted to a navigation device (e.g., by a service provider 106 to a navigation device 104) less frequently without sacrificing positional accuracy for the navigation device.

At block 612, the apparatus 200 includes means, such as the processing circuitry 202, communication interface 206, and/or the like, configured to transmit, to the requesting device, the one or more correction messages based on the dynamic correction data update rate. For example, once the service provider 106 has determined the dynamic correction data update rate for one or more requesting devices, the service provider 106 can transmit one or more correction messages to the one or more requesting devices based on the dynamic correction data update rate. It will be appreciated that, in one or more embodiments, the information associated with the grid layout data and/or correction data that generated and transmitted (e.g., the grid layout definition message and/or correction message) may be tailored to the requesting device (e.g., the navigation device 104) based upon the request received therefrom such that the information regarding the corrections that is most useful to the requesting device is identified and transmitted in an efficient manner.

As described herein, embodiments of the present disclosure provide the technical benefit of reducing bandwidth consumption of computing devices related to both the service providers 106 (e.g., service providers computing and transmitting the correction data) and requesting devices (e.g., navigation devices 104, smart phones, smartwatches, etc.). Furthermore, embodiments of the present disclosure provide the technical benefit of reducing the computational resources required by one or more navigation devices 104 (e.g., consumer-grade computing devices comprising navigational components) to accurately calculate and employ correction data associated with navigation signals impacted by atmospheric delay and/or advance. Further still, embodiments of the present disclosure provide the technical benefit of increasing the efficiency of data transmissions executed by the computing devices associated with a service provider 106 by dynamically reducing the size of one or more data messages associated with the correction data and/or positional data (e.g., correction messages and/or grid layout definition messages). It will be appreciated by one or more persons of ordinary skill in the art that the aforementioned technological improvements are applicable to a multitude of industries, and that applications of the various methods and operations described herein can be employed to improve technologies related to various industries such as, for example, telecommunication technologies, navigation technologies, logistic technologies, autonomous vehicle technologies, health and safety technologies, and/or the like.

As described herein, FIGS. 5 and 6 are flow diagrams of an apparatus 200, method, and computer program product configured to allow requests for information associated with atmospheric corrections to be tailored, such as based upon the requirements and/or the position of the navigation device 104 according to an example embodiment. It will be understood that each block of the flow diagrams, and combinations of blocks in the flow diagrams, may be implemented by various means, such as hardware, firmware, processing circuitry 202, and/or other devices associated with execution of software including one or more computer program instructions. For example, one or more of the procedures described herein may be embodied by computer program instructions. In this regard, the computer program instructions which embody the procedures described herein may be stored by the memory device 204 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

In some embodiments, certain ones of the operations herein may be modified or further amplified. Furthermore, in some embodiments, additional optional operations may be included. Modifications, additions, or amplifications to the operations herein may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described herein are also contemplated as may be set forth in some of the appended claims. Although specific terms are employed herein, they are used in a generic and descriptive sense only and not for purposes of limitation.

That which is claimed:

1. A computer-implemented method comprising:

receiving, from a requesting device, a request for grid layout data, wherein the grid layout data is associated with one or more geographical areas experiencing at least some atmospheric delay incurred with a satellite-based positioning technique;

transmitting, in response to the request for the grid layout data, a grid layout definition message, wherein the grid layout definition message comprises a grid layout definition associated with the grid layout data associated with the one or more geographical areas, wherein the grid layout data of the grid layout definition message comprises data associated with one or more individual grids, and wherein the one or more individual grids comprise one or more correction data points associated with one or more specific locations within the one or more geographical areas;

generating correction data based in part on the grid layout data, wherein the correction data is configured to correct the at least some atmospheric delay incurred with the satellite-based positioning technique, by applying a polynomial model to the one or more correction data points of the one or more individual grids, wherein the polynomial model applied is selected based at least in part on a residual threshold and the data size of the polynomial model;

generating one or more correction messages, wherein the one or more correction messages comprise at least a portion of the correction data;

determining a dynamic correction data update rate, wherein the dynamic correction data update rate and size of the one or more correction messages is based in part on an ionospheric activity model; and transmitting, to the requesting device, the one or more correction messages based on the dynamic correction data update rate.

2. The computer-implemented method of claim 1, further comprising:

receiving, from the requesting device, a request for correction data, wherein the request for correction data is based in part on a position estimation of the requesting device.

3. The computer-implemented method of claim 1, wherein generating the correction data associated with the one or more correction data points further comprises:

fitting polynomials of a plurality of polynomial models to the one or more correction data points to determine a preferred polynomial model, wherein determining the preferred polynomial model is based in part on a comparison of a corresponding data size associated with each polynomial model of the plurality of polynomial models, and wherein the corresponding data size of the preferred polynomial model is smaller relative to the respective corresponding data size of each of the other polynomials of the plurality of polynomial models.

4. The computer-implemented method of claim 1, wherein the ionospheric activity model describes ionospheric activity data related to the one or more geographical areas experiencing the at least some atmospheric delay incurred with the satellite-based positioning technique, and wherein the ionospheric activity data comprises at least one of one or more portions of current ionospheric activity data, one or more portions of predicted ionospheric activity data, one or more portions of current solar activity data, or one or more portions of predicted solar activity data.

5. The computer-implemented method of claim 4, wherein the dynamic correction data update rate is based in part on a predetermined change threshold associated with one or more data values associated with the ionospheric activity data.

6. The computer-implemented method of claim 5, wherein the polynomials of the plurality of polynomial models are fit to the one or more correction data points in response to a determination that the ionospheric activity model has been updated.

7. The computer-implemented method of claim 3, wherein the polynomials of the plurality of polynomial models are fit to the one or more correction data points in response to a determination that a navigation satellite associated with the satellite-based positioning technique is within view of the one or more individual grids.

8. The computer-implemented method of claim 1, wherein the dynamic correction data update rate is based in part on a time of day relative to the one or more specific locations within the one or more geographical areas.

9. An apparatus comprising processing circuitry and at least one memory including computer program code, the at least one memory and the computer program code configured to, with the processing circuitry, cause the apparatus at least to:

receive, from a requesting device, a request for grid layout data, wherein the grid layout data is associated with one or more geographical areas experiencing at least some atmospheric delay incurred with a satellite-based positioning technique;

transmit, in response to the request for the grid layout data, a grid layout definition message, wherein the grid layout definition message comprises a grid layout definition associated with the grid layout data associated with the one or more geographical areas, wherein the grid layout data of the grid layout definition message comprises data associated with one or more individual grids, and wherein the one or more individual grids comprise one or more correction data points associated with one or more specific locations within the one or more geographical areas;

generate correction data based in part on the grid layout data, wherein the correction data is configured to correct the at least some atmospheric delay incurred with the satellite-based positioning technique, by applying a polynomial model to the one or more correction data points of the one or more individual grids, wherein the polynomial model applied is selected based at least in part on a residual threshold and the data size of the polynomial model;

generate one or more correction messages, wherein the one or more correction messages comprise at least a portion of the correction data;

determine a dynamic correction data update rate, wherein the dynamic correction data update rate and size of the one or more correction messages is based in part on an ionospheric activity model; and transmit, to the requesting device, the one or more correction messages based on the dynamic correction data update rate.

10. The apparatus of claim 9, wherein the computer program code further causes the apparatus to:

receive, from the requesting device, a request for correction data, wherein the request for correction data is based in part on a position estimation of the requesting device.

11. The apparatus of claim 9, wherein the computer program code to generate the correction data associated with the one or more correction data points further causes the apparatus to:

fit polynomials of a plurality of polynomial models to the one or more correction data points to determine a preferred polynomial model, wherein determining the preferred polynomial model is based in part on a comparison of a corresponding data size associated with each polynomial model of the plurality of polynomial models, and wherein the corresponding data size of the preferred polynomial model is smaller relative to the respective corresponding data size of each of the other polynomials of the plurality of polynomial models.

12. The apparatus of claim 9, wherein the ionospheric activity model describes ionospheric activity data related to the one or more geographical areas experiencing the at least some atmospheric delay incurred with the satellite-based positioning technique, and wherein the ionospheric activity data comprises at least one of one or more portions of current ionospheric activity data, one or more portions of predicted ionospheric activity data, one or more portions of current solar activity data, or one or more portions of predicted solar activity data.

13. The apparatus of claim 12, wherein the dynamic correction data update rate is based in part on a predetermined change threshold associated with one or more data values associated with the ionospheric activity data.

* * * * *